United States Patent
Oh

(10) Patent No.: US 11,418,346 B2
(45) Date of Patent: Aug. 16, 2022

(54) SYSTEM AND METHOD FOR RECOGNITION OF BIOMETRIC INFORMATION IN SHARED VEHICLE

(71) Applicant: LG Electronics Inc., Seoul (KR)

(72) Inventor: Soo-Hwan Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 16/557,142

(22) Filed: Aug. 30, 2019

(65) Prior Publication Data

US 2020/0007338 A1 Jan. 2, 2020

(30) Foreign Application Priority Data

Aug. 12, 2019 (KR) .......................... 10-2019-0098432

(51) Int. Cl.
*H04L 9/32* (2006.01)
*H04L 9/08* (2006.01)
*G06Q 10/02* (2012.01)
*H04L 9/00* (2022.01)
*H04L 9/30* (2006.01)

(52) U.S. Cl.
CPC ........... *H04L 9/3231* (2013.01); *G06Q 10/02* (2013.01); *H04L 9/008* (2013.01); *H04L 9/0866* (2013.01); *H04L 9/30* (2013.01)

(58) Field of Classification Search
CPC ..... H04L 9/3231; H04L 9/008; H04L 9/0866; H04L 9/30; H04L 2209/84; G06Q 10/02; G06Q 50/30; B60W 30/14; B60W 2040/0809; B60W 2040/0872; B60W 40/08; B60Y 2300/14
See application file for complete search history.

(56) References Cited

U.S. PATENT DOCUMENTS

| | | | |
|---|---|---|---|
| 8,060,753 B2 * | 11/2011 | King | G06F 21/32 713/169 |
| 10,501,055 B1 * | 12/2019 | Yi | B60R 25/257 |
| 2013/0263211 A1 * | 10/2013 | Neuman | H04L 9/3247 726/1 |
| 2017/0366345 A1 * | 12/2017 | Robison | H04L 9/0866 |
| 2018/0359229 A1 * | 12/2018 | Ding | H04L 63/0464 |
| 2019/0276044 A1 | 9/2019 | Bae et al. | |
| 2019/0291642 A1 | 9/2019 | Chae et al. | |
| 2020/0228340 A1 * | 7/2020 | Blackhurst | H04L 63/0861 |

(Continued)

FOREIGN PATENT DOCUMENTS

| | | |
|---|---|---|
| KR | 1020100138478 | 12/2010 |
| KR | 1020180006733 | 1/2018 |
| KR | 1020180026963 | 3/2018 |

(Continued)

OTHER PUBLICATIONS

KR Notice of Allowance in Korean Appln. No. 10-2019-0098432, dated Nov. 30, 2020, 22 pages (with English translation).

*Primary Examiner* — Theodore C Parsons
(74) *Attorney, Agent, or Firm* — Fish & Richardson P.C.

(57) ABSTRACT

A system and method for recognition of biometric information for a shared vehicle in which data exposure is prevented which may otherwise occur when using a biometric recognition function in a shared vehicle or autonomous driving vehicle in a shared environment. The system and method may be associated with an AI device, a drone, an UAV, a robot, an AR device, a VR device, and a 5G service.

18 Claims, 13 Drawing Sheets

(56) References Cited

U.S. PATENT DOCUMENTS

2020/0293643 A1* 9/2020 Wang ................. G06K 9/00288

FOREIGN PATENT DOCUMENTS

| | | |
|----|--------------|--------|
| KR | 1020180049346 | 5/2018 |
| KR | 1020180051225 | 5/2018 |
| KR | 1020180051977 | 5/2018 |
| KR | 1020190029920 | 3/2019 |

* cited by examiner

SYSTEM AND METHOD FOR RECOGNITION OF BIOMETRIC INFORMATION IN SHARED VEHICLE

CROSS-REFERENCE TO RELATED APPLICATIONS

This application claims the priority of Korean Patent Application No. 10-2019-0098432, filed on Aug. 12, 2019, in the Korean Intellectual Property Office, the disclosure of which is hereby incorporated by reference in its entirety.

BACKGROUND

1. Technical Field

The present disclosure relates to a system and a method for authenticating a user via recognition of biometric information for a shared vehicle or autonomous driving vehicle.

2. Description of the Related Art

In general, a shared vehicle service is a new concept of a service system that allows members of a shared vehicle service system to use vehicles owned and managed by companies, public institutions, and individuals for free.

In shared vehicle services, a cost and labor used in acquiring, maintaining, and managing a vehicle that are up to a corporate management system rather than an individual driver owning a vehicle. In recent years, the shared vehicle service has gained much attention around the world.

In particular, with development of an autonomous driving vehicle, the shared vehicle service is expected to become more common.

In this shared vehicle service system, a user registers his/her account at a shared car company. Then, the user uses a car parked in a specific place via an electronic key that provides input to an integrated circuit (IC) card or a mobile phone. Thus, the vehicle is less likely to be stolen or misused.

Further, in order to prevent theft of a vehicle, an anti-theft system that recognizes a user is configured into the vehicle. However, an existing vehicle anti-theft system may be applied only to a case where a specific vehicle owner uses a corresponding vehicle. Thus, there is a problem that the existing vehicle anti-theft system may not apply to a car sharing system used by unspecified users.

Further, the existing vehicle anti-theft system has a problem that because a user's personal information is stored in a control device of a vehicle, and the personal information may leak to outside when the vehicle is transferred or rented to another person. In particular, there is a high security risk because personal biometric information is not encrypted.

Moreover, even when private biometric information is encrypted, the information may be decrypted for comparison operation. Thus, the biometric information may be leaked in an attack, such as a memory dump from a hacker.

Further, the personal biometric information may not be re-registered or cancelled in the shared vehicle service system.

SUMMARY

The present disclosure provides a system and method for recognition of biometric information for a shared vehicle in which data exposure is prevented in an environment that uses a biometric recognition function in a shared vehicle or autonomous driving vehicle in a shared environment.

Furthermore, another purpose of the present disclosure is to provide a system and method for recognition of biometric information for a shared vehicle in which even when encrypted biometric authentication information is leaked to outside by external attack and internal error, original biometric authentication data may be protected because the biometric information is encrypted.

Furthermore, another purpose of the present disclosure is to provide a system and method for recognition of biometric information for a shared vehicle in which when a user destroys a private key, encrypted biometric authentication information stored in a shared-vehicle or a shared-vehicle server may be invalidated.

Furthermore, another purpose of the present disclosure is to provide a system and method for recognition of biometric information for a shared vehicle in which when an authentication result is tampered after decryption thereof by a user device, the authentication result is re-encrypted using a public key and then is verified in a shared-vehicle, thereby to solve the problem of tampering with the authentication result.

Furthermore, another purpose of the present disclosure is to provide a system and method for recognition of biometric information for a shared vehicle in which an authentication device and a user device are used in an integrated manner.

Furthermore, another purpose of the present disclosure is to provide a system and method for recognition of biometric information for a shared vehicle in which a reserved user verification process which may be otherwise performed by a shared-vehicle may performed by a shared-vehicle server.

Furthermore, another purpose of the present disclosure is to provide a system and method for recognition of biometric information for a shared vehicle in which raw data may be directly used instead of a biometric authentication data template.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In a first aspect of the present disclosure, a system is described for recognizing user biometric information, comprising: a key generation unit configured to generate a private key and a public key; a decrypting unit configured to: receive an authentication result from a shared vehicle, wherein the authentication result is generated based on user biometric information and the public key; and decrypt the authentication result using the private key; and an authentication result processing unit configured to: transmit the decrypted authentication result to the shared vehicle; and very identity authentication received from the shared vehicle, wherein the identity authentication is performed by the shared vehicle based on the decrypted authentication result.

In one implementation of the first aspect, the system further comprising a user registration unit configured to: receive the user biometric information; and generate first biometric information by encrypting the user biometric information using the public key.

In one implementation of the first aspect, the user registration unit comprises: a first biometric registration unit configured to extract biometric information of a user to obtain biometric authentication data; a first encrypting unit configured to generate the first biometric information by encrypting the obtained biometric authentication data using the public key; and a storage configured to store the public key, user device information, and the first biometric information.

In one implementation of the first aspect, the shared vehicle comprises: a second biometric registration unit configured to extract user biometric information to obtain biometric authentication data; a second encrypting unit configured to generate second biometric information by encrypting the obtained biometric authentication data using the public key; an encryption-based computation unit configured to compute the second biometric information and the first biometric information using homomorphic encryption (HE) to generate a homomorphic encrypted authentication result; and an authentication verifying unit configured to compare third biometric information and the second biometric information, and authenticate the user based on the comparison result, wherein the third biometric information is generated by encrypting the decrypted homomorphic encrypted authentication result using the public key.

In one implementation of the first aspect, the system further comprising a shared-vehicle server configured to: allocate the shared vehicle to a user device; and transmit encrypted first biometric information, the public key, and user device information stored in a user account to the allocated shared vehicle.

In one implementation of the first aspect, the shared-vehicle server further configured to: detect that user biometric information stored in a specific user account has been leaked from the shared-vehicle server; transmit a message to a user device corresponding to the user account to notify a user of the leakage of the user biometric information; receive a request for user deregistration to the shared-vehicle server; and in response to reception of the request, deregister a user corresponding to the user device via a user deregistration operation.

In one implementation of the first aspect, the shared-vehicle server further configured to: receive a first message to notify the shared-vehicle server of the leakage of the user biometric information; in response to reception of the first message, search user information corresponding to the shared vehicle; and deliver a second message informing a user of the leakage of user information to a user device corresponding to the leaked user information.

In one implementation of the first aspect, the authentication verifying unit further configured to: determine, based on the comparison result revealing that the first biometric information and the second biometric information match, that the user is a reserved user; and determine, based on the comparison result revealing that the first biometric information and the second biometric information do not match, that the user is not a reserved user.

In a second aspect of the present disclosure, a method is described for recognizing user biometric information, comprising: generating, by a key generation unit, a private key and a public key; generating, by a first encrypting unit, first biometric information by encrypting biometric authentication data using the public key; receiving, by a decrypting unit, second biometric information from a shared vehicle, wherein the second biometric information is generated based on user biometric information and the public key; decrypting, by the decrypting unit, the second biometric information using the private key; transmitting a decrypted authentication result to the shared vehicle; comparing, by an authentication verifying unit, the second biometric information and third biometric information, wherein the third biometric information is generated by encrypting the decrypted authentication result using the public key; and authenticating, by the authentication verifying unit, a user based on the comparison result.

In one implementation of the second aspect, the method further comprising: receiving, by a user registration unit, user biometric information; and generating, by the user registration unit, the first biometric information by encrypting the user biometric information using the public key.

In one implementation of the second aspect, generating the first biometric information comprises: extracting, by a first biometric registration unit, biometric information of a user to acquire biometric authentication data; generating, by a first encrypting unit, the first biometric information, wherein the first biometric information is generated by encrypting the acquired biometric authentication data using the public key; and storing the public key, user device information, and the third biometric information.

In one implementation of the second aspect, authenticating the user comprises: extracting user biometric information by a second biometric registration unit to obtain biometric authentication data; generating, by a second encrypting unit, the second biometric information, wherein the second biometric information is generated by encrypting the obtained biometric authentication data using the public key; and computing, by a homomorphic encryption-based computation unit, the first biometric information and the second biometric information using homomorphic encryption (HE).

In one implementation of the second aspect, authenticating the user further comprises: receiving, by a second encrypting unit, the decrypted authentication result from a user device; generating, by the second encrypting unit, the third biometric information by encrypting the decrypted authentication result using the public key; comparing, by the authentication verifying unit, the second biometric information and the third biometric information with each other; determining, based on the comparison result revealing that the first biometric information and the second biometric information are match, by the authentication verifying unit, that the user is a reserved user; and determining, based on the comparison result revealing that the first biometric information and the second biometric information do not match, by the authentication verifying unit, that the user is not a reserved user.

In one implementation of the second aspect, the method further comprising a user device registration operations, wherein the user device registration operations comprises: generating a private key and a public key by the key generation unit; storing the private key in the user device and transmitting the public key to a user registration unit; extracting user biometric information by a first biometric information registration unit to obtain biometric authentication data; extracting, by the first biometric information registration unit, feature points from the obtained biometric authentication data to generate a template; generating first biometric information by encrypting the template corresponding to the biometric information using the public key; transmitting the first biometric information, the public key, and information about the user device to a shared-vehicle server; and storing, by the shared-vehicle server, the first biometric information, the public key, and information about the user device in a user account.

In one implementation of the second aspect, the method further comprising shared vehicle reservation operations, wherein the shared vehicle reservation operations comprise:

registering, by a user device, a shared vehicle on a shared-vehicle server; allocating, by the shared-vehicle server, the registered shared vehicle to the user device; transmitting, from the shared-vehicle server to the allocated shared vehicle, encrypted first biometric information, the public key, and user device information stored in a user account; and receiving and storing, by the allocated shared vehicle, the encrypted first biometric information, the public key, and the user device information.

In one implementation of the second aspect, the method further comprising shared vehicle reservation cancellation operations, wherein the shared vehicle reservation cancellation operations comprise: transmitting, by a user device, a shared vehicle reservation cancellation to a shared-vehicle server; searching, by the shared-vehicle server, a reserved shared vehicle corresponding to the user device; transmitting, from the shared-vehicle server to the shared vehicle, encrypted first biometric information, the public key, and user device information stored in a user account; and deleting, by the shared vehicle, the first biometric information, the public key, and user device information from reservation information of the shared vehicle.

In one implementation of the second aspect, the method further comprising user deregistration operations, wherein the user deregistration operations comprise: activating a user deregistration application installed on a user device to transmit a user deregistration request to a shared-vehicle server; deleting, by the user device, the private key and the public key stored in the user device; in response to reception of the user deregistration request, deleting, by the shared-vehicle server, encrypted third biometric information, the public key, and user device information stored in a user account; searching, by the shared-vehicle server, a reserved shared vehicle corresponding to the user device; transmitting, from the shared-vehicle server to the searched shared vehicle, a request for deletion of reservation information corresponding to the user device; and in response to reception of the deletion request, deleting, by the shared vehicle, the reservation information corresponding to the user device from a reservation information of the shared vehicle.

In one implementation of the second aspect, the method further comprising: detecting, by a shared-vehicle server, that user biometric information stored in a specific user account has been leaked from the shared-vehicle server; transmitting, by the shared-vehicle server, a message to a user device corresponding to the user account to notify a user of the leakage of the user biometric information; in response to reception of the message, transmitting, by the user device, a request for user deregistration to the shared-vehicle server; deleting, by the user device, the private key and the public key stored in the user device; and in response to reception of the request, deregistering, by the shared-vehicle server, a user corresponding to the user device via a user deregistration operation.

In one implementation of the second aspect, the method further comprising: detecting, by a shared-vehicle, that user biometric information stored therein has been leaked from the shared vehicle; transmitting, by the shared vehicle, a first message to a shared-vehicle server to notify the shared-vehicle server of the leakage of the user biometric information; in response to reception of the first message, searching, by the shared-vehicle server, user information corresponding to the shared vehicle; delivering, by the shared-vehicle server and to a user device corresponding to the leaked user information, a second message informing of the leakage of the user information; and in response to reception of the second message, deregistering, by the user device, a user corresponding to the user device.

In one implementation of the second aspect, the method further comprising: receiving, by a shared-vehicle server, a loss report of a user device; in response to reception of the loss report, deleting, by the shared-vehicle server, the first biometric information, the public key, and user device information stored in a user account corresponding to the user device; canceling, by the shared-vehicle server, a shared vehicle reservation; and registering, by the shared-vehicle server, a new user device thereon.

Advantages of the present disclosure are as follows but are not limited thereto.

In accordance with a system and method for recognition of biometric information for a shared vehicle according to the present disclosure, data exposure is prevented which may otherwise occur when using a biometric recognition function in a shared vehicle or autonomous driving vehicle in a shared environment.

Further, in accordance with a system and method for recognition of biometric information for a shared vehicle according to the present disclosure, even when encrypted biometric authentication information has been leaked to outside in external attack and internal error, original biometric authentication data may be protected because the biometric information is encrypted.

Further, in accordance with a system and method for recognition of biometric information for a shared vehicle according to the present disclosure, when a user destroys a private key, encrypted biometric authentication information stored in a shared-vehicle or a shared-vehicle server may be invalidated.

Further, in accordance with a system and method for recognition of biometric information for a shared vehicle according to the present disclosure, when an authentication result is tampered after decryption thereof by a user device, the authentication result is re-encrypted using a public key and then is verified in a shared-vehicle, thereby to solve the problem of tampering with the authentication result.

Further, in accordance with a system and method for recognition of biometric information for a shared vehicle according to the present disclosure, an authentication device and a user device are used in an integrated manner.

Further, in accordance with a system and method for recognition of biometric information for a shared vehicle according to the present disclosure, a reserved user verification process which may be otherwise performed by a shared-vehicle may performed by a shared-vehicle server.

Further, in accordance with a system and method for recognition of biometric information for a shared vehicle according to the present disclosure, raw data may be directly used instead of a biometric authentication data template.

In addition to the effects as described above, specific effects of the present disclosure are described together with specific details for carrying out the invention.

DETAILED DESCRIPTIONS

Figure 1:
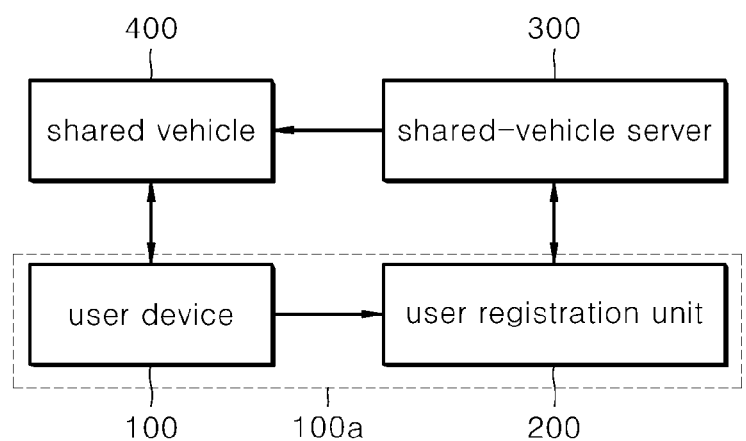
FIG. 1 is a block diagram showing an example configuration of a biometric information recognizing system for a shared vehicle.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, biometric information recognizing systems and methods in a shared vehicle according to some embodiments of the present disclosure will be described.

FIG. 1 is a block diagram showing an example configuration of a biometric information recognizing system for a shared vehicle according to an embodiment of the present disclosure. The biometric information recognizing system in the shared vehicle shown in FIG. 1 may be merely one example. Components thereof are not limited to the embodiment shown in FIG. 1. Some components may be added, changed or deleted as necessary.

As shown in FIG. 1, the biometric information recognizing system in the shared vehicle in accordance with the present disclosure includes a user device 100, a user registration unit 200, a shared-vehicle server 300, and a shared vehicle 400. In this connection, the user registration unit 200 may be included in the user device 100 or may be integrated with the user device 100 to form an integrated device 100a together. Alternatively, the user registration unit 200 may be included in the shared-vehicle server 300 or may be integrated with the shared-vehicle server 300.

The user device 100 generates a private key and a public key, and decrypts a homomorphic encrypted authentication result input from the shared vehicle 400 and transmit the decrypted result to the shared vehicle 400 to perform identity verification. An application to perform identity verification may be installed on the user device. The application is driven by user manipulation. The user may execute the installed application by simply selecting (touching or buttoning) the application displayed on a display window (screen) of the user device 100.

The user device 100 may be embodied as a computer, an UMPC (Ultra Mobile PC), a workstation, a net-book, a PDA (Personal Digital Assistant), a portable computer, a web tablet, a cordless phone, a mobile phone, a smartphone, an e-book, a PMP (portable multimedia player), a portable game machine, a navigation device, a black box or a digital camera. However, the present disclosure is not limited thereto.

Figure 2:
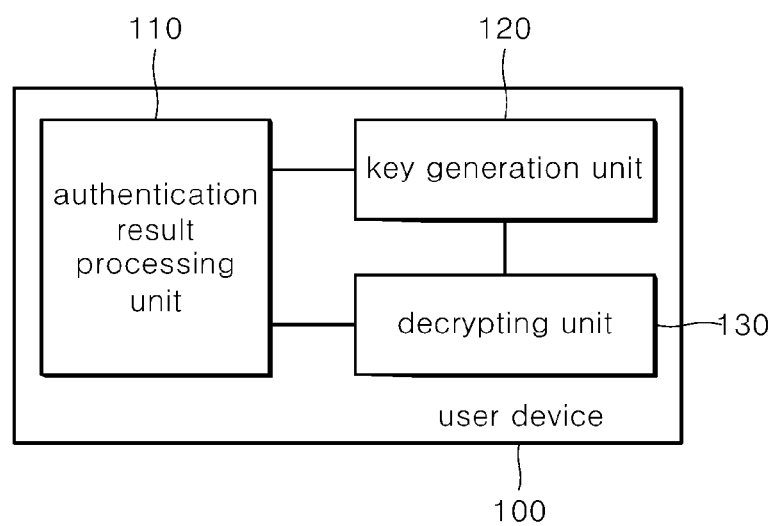
FIG. 2 is a block diagram showing an example configuration of a user device of FIG. 1 in detail.

FIG. 2 is a block diagram showing an example configuration of a user device of FIG. 1 in detail.

As shown in FIG. 2, the user device 100 may include a key generation unit 120 that generates a private key and a public key, a decrypting unit 130 for decrypting an encrypted authentication result input from the shared vehicle 400 using the private key generated by the key generation unit 120, and an authentication result processing unit 110 for transmitting the decrypted authentication result from the decrypting unit 130 to the shared vehicle 400.

The user registration unit 200 receives biometric information from the user, and encrypts the biometric information using the public key generated by the key generation unit 120 to perform user registration. Then, the user registration unit 200 transmits the encrypted biometric information of the registered user, the public key, and information about the user device 100 to the shared-vehicle server 300. In this connection, the biometric information may include fingerprints, veins, retinas, irises, voices, and images.

Figure 3:
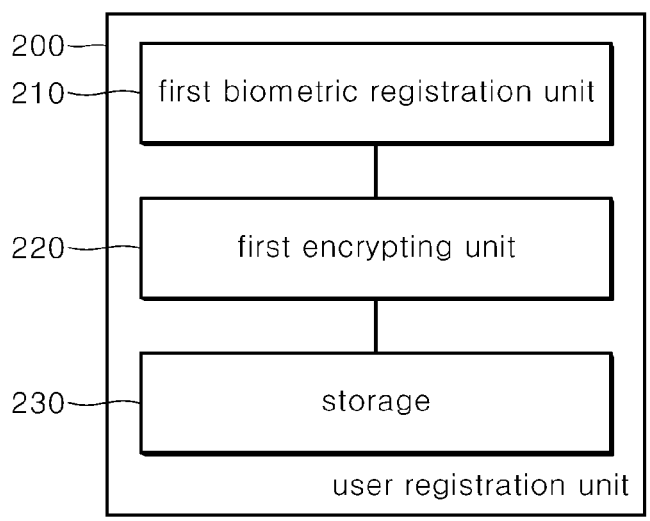
FIG. 3 is a block diagram showing an example configuration of a user registration unit of FIG. 1 in detail.

FIG. 3 is a block diagram showing an example configuration of the user registration unit of FIG. 1 in detail.

As shown in FIG. 3, the user registration unit 200 may include a first biometric registration unit 210 to extract the biometric information of the user to obtain biometric authentication data, a first encrypting unit 220 for encrypting the biometric authentication data obtained from the first biometric registration unit 210 using the public key generated by the user device 120, and a storage 230 for storing the public key transmitted from the user device 100 and information about the user device 100 together with first biometric information encrypted by the first encrypting unit 220. In this connection, the information about the user device 100 may include a telephone number, terminal information, IP information, and the like.

The first biometric registration unit 210 may include a fingerprint sensor that recognizes the user's fingerprint and a camera that recognizes the user's iris. However, the first biometric registration unit 210 is not limited thereto. The first biometric registration unit 210 may be embodied as a variety of recognizing device that may recognize at least one of biometric information such as fingerprint, vein, retina, iris, voice, or image.

The shared-vehicle server 300 receives the first biometric information encrypted by the user registration unit 200, the public key, and the information about the user device 100, and registers each user account and stores the first biometric information encrypted by the user registration unit 200, the public key, and the information about the user device 100 based on each user.

The shared-vehicle server 300 has the same configuration as a normal web server in hardware. In software, the shared-vehicle server 300 may include program modules implemented using various languages such as C, C++, Java, Visual Basic, Visual C, etc. to perform various functions. Alternatively, the shared-vehicle server 300 may be built based on a cloud. The shared-vehicle server 300 may be operated by a transportation company server such as a car sharing company. Further, when the shared vehicle 400 is an autonomous driving vehicle, the shared-vehicle server 300 may control the shared vehicle 400 using wireless data communication.

The shared vehicle 400 receives the encrypted first biometric information, the public key, and the user device information about a reserved user transmitted from the shared-vehicle server 300. Then, the shared vehicle 400 receives biometric information from the user, and encrypts the biometric information using the public key input from the shared-vehicle server 300. In this connection, the biometric information may include fingerprints, veins, retinas, irises, voices, and images.

The shared vehicle 400 computes second biometric information encrypted using the public key input from the shared-vehicle server 300 and the encrypted first biometric information input from the shared-vehicle server 300 using homomorphic encryption (HE). Then, the shared vehicle 400 sends a homomorphic encrypted authentication result to the user device 400. Then, the shared vehicle 400 authenticates the reserved user by using a decrypted authentication result corresponding to the homomorphic encrypted authentication result sent to the user device 100 as an input.

In this connection, the shared vehicle 400 may be a shared-vehicle operated by a transportation company server, such as a car sharing company or may be an autonomous driving vehicle that drives to its destination without the operator's manipulation. Further, the shared vehicle 400 may include any means for transportation, such as a car, a train, a motorcycle. However, an example in which the vehicle 400 is a car will be described below for the convenience of description. Further, the shared vehicle 400 may be an internal combustion engine vehicle having an engine as a power source, a hybrid vehicle having an engine and an electric motor as the power source, and an electric vehicle having an electric motor as the power source.

When the shared vehicle 400 is an autonomous driving vehicle, the vehicle may include a user interface device, an object detecting device, a communication device, a driving manipulation device, a main ECU, a driving control device, an autonomous driving device, a sensor, and a position data generating device. Each of the object detecting device, the communication device, the driving manipulation device, the main ECU, the driving control device, the autonomous driving device, the sensor, and the position data generating device may be implemented as an electronic device for generating an electrical signal and for exchanging the electrical signal with another device.

The user interface device is configured for communicating between the shared vehicle 400 and the user. The user interface device may receive user input, and may provide the user with information generated by the shared vehicle 400. The shared vehicle 400 may implement a UI (User Interface) or a UX (User Experience) via the user interface device. The user interface device may include an input device, an output device, and a user monitoring device.

The object detecting device may generate information about an object external to the shared vehicle 400. The information on the object may include at least one of information on presence or absence of the object, position information of the object, distance information between the shared vehicle 400 and the object, or relative speed information between the shared vehicle 400 and the object. The object detecting device may detect an object external to the shared vehicle 400. The object detecting device may include at least one sensor that may detect an object external to the shared vehicle 400. The object detecting device may include at least one of a camera, a radar, a lidar, an ultrasonic sensor, or an infrared sensor. The object detecting device may provide at least one electronic device included in the vehicle with data about the object generated based on the sensing signal generated by the sensor.

The camera may generate information about the object external to the shared vehicle 400 using the image. The camera may include at least one lens, at least one image sensor, and at least one processor. The processor may be electrically connected to the image sensor and then process a received signal therefrom and generate data about an object based on the processed signal.

The camera may include at least one of a mono camera, a stereo camera, or an AVM (Around View Monitoring) camera. The camera may acquire position information of the object, distance information to the object, or relative speed information relative to the object using various image processing algorithms. For example, the camera may obtain distance information to and relative speed information with respect to the object based on a change of an object size over time in the acquired image. For example, the camera may obtain the distance information to and relative speed information with respect to the object via a pinhole model, road-face profiling, or the like. For example, the camera may obtain the distance information to and relative speed information with respect to the object based on disparity information in a stereo image acquired by a stereo camera.

The camera may be mounted at a position that allows a field of view (FOV) in the vehicle to image a scene external to the vehicle. The camera may be placed to a front windshield and in an interior of the vehicle to obtain an image in front of the vehicle. The camera may be disposed adjacent to a front bumper or radiator grille. The camera may be placed to a rear glass and in the interior of the vehicle to obtain an image behind the vehicle. The camera may be disposed adjacent to a rear bumper, a trunk or a tail gate. The camera may be disposed to at least one of side windows and in an interior of the vehicle to obtain a right or left side image to the vehicle. Alternatively, the camera may be positioned adjacent to a side mirror, a fender or a door.

The radar may generate information about an object external to the shared vehicle 400 using a radio wave. The radar may include an electromagnetic wave transmitter, an electromagnetic wave receiver, and at least one processor electrically connected to the electromagnetic wave transmitter and the electromagnetic wave receiver to process the received signal therefrom to generate data about an object based on the processed signal. The radar may be implemented in a pulse radar manner or a continuous wave radar manner based on a principle of the radio wave emission. The radar in the continuous wave radar manner may be classified into a FMCW (Frequency Modulated Continuous Wave) type and a FSK (Frequency Shift Keying) type based on a signal waveform. The radar detects the object using the electromagnetic wave in the TOF (Time of Flight) or phase shift manner and thus determines a position of the detected object, a distance to the detected object, and the relative speed thereto. The radar may be positioned at an appropriate position on an outer face of the vehicle to detect an object positioned in front, rear of or right or left to the vehicle.

The lidar may generate information about an object external to the shared vehicle 400 using a laser light. The lidar may include an optical transmitter, an optical receiver and at least one processor electrically connected to the optical transmitter and the optical receiver to process a received signal therefrom for generating data about the object based on the processed signal. The lidar may be implemented in a TOF (time of flight) manner or a phase-shift manner. The lidar may be implemented in a movable or fixe manner. When the lidar is implemented in the movable manner, the lidar is rotated by a motor, and detects objects around the shared vehicle 400. When the lidar is implemented in a fixed manner, the lidar may detect an object positioned within a predefined range with respect to the vehicle using optical steering. The shared vehicle 400 may include a plurality of fixed lidars. The lidar detects an object in a TOF (Time of Flight) manner or a phase-shift manner via laser light, and thus determines a position of the detected object, a distance to the detected object, and the relative speed thereto. The lidar may be positioned at an appropriate position on an outer face of the vehicle to detect an object positioned in front, rear of or right or left to the vehicle.

The communication device may exchange signals with a device external to the shared vehicle 400. The communication device may exchange signals with at least one of an infrastructure (for example, a server, a broadcasting station), another vehicle, or a terminal. The communication device may include at least one of a transmit antenna, a receive antenna, an RF (radio frequency) circuit capable of implementing various communication protocols, or an RF element to perform communication.

The driving manipulation device is configured to receive a user input for driving. In a manual mode, the shared vehicle 400 may be driven based on a signal provided by the driving manipulation device. The driving manipulation device may include a steering input device such as a steering wheel, an acceleration input device such as an accelerator pedal, and a braking input device such as a brake pedal.

The main ECU may control overall operations of at least one electronic device provided in the shared vehicle 400.

The drive control device is configured to electrically control various vehicle drive devices in the shared vehicle 400. The drive control device may include a power train drive control device, a chassis drive control device, a door/window drive control device, a safety device drive control device, a lamp drive control device and an air conditioning drive control device. The power train drive control device may include a power source drive control device and a transmission drive control device. The chassis drive control device may include a steering drive control device, a brake drive control device and a suspension drive control device. In one example, the safety device drive control device may include a seat belt drive control device for seat belt control.

The drive control device includes at least one electronic control device, for example, a control ECU (Electronic Control Unit).

The drive control device may control the vehicle drive device based on the signal received from the shared vehicle 400. For example, the drive control device may control the power train, steering device and brake device based on the signal received from the shared vehicle 400.

The autonomous driving device may generate a route for autonomous driving based on the obtained data. The autonomous driving device may generate a driving plan for driving along the generated route. The autonomous driving device may generate a signal for controlling movement of the vehicle according to the driving plan. The autonomous driving device may provide the generated signal to the drive control device.

The autonomous driving device may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), PD (pedestrian) collision warning, TSR (Traffic Sign Recognition), TSA (Traffic Sign Assist), NV (Night Vision), DSM (Driver Status Monitoring), or TJA (Traffic Jam Assist).

The autonomous driving device may perform a switching operation from the autonomous driving mode to a manual driving mode or a switching operation from the manual driving mode to the autonomous driving mode. For example, the autonomous driving device may switch a mode of the shared vehicle 400 from the autonomous driving mode to the manual driving mode or from the manual driving mode to the autonomous driving mode based on the signal received from the user interface device.

The sensor may sense a state of the vehicle. The sensor may include at least one of a IMU (inertial measurement unit) sensor, a collision sensor, a wheel sensor, a speed sensor, a tilt sensor, a weight sensor, a heading sensor, a position module, a vehicle forward/rearward sensor, a battery sensor, a fuel sensor, a tire sensor, a steering sensor, a temperature sensor, a humidity sensor, an ultrasonic sensor, a luminance sensor, or a pedal position sensor. In one example, the IMU (inertial measurement unit) sensor may include one or more of an acceleration sensor, a gyro sensor, and a magnetic sensor.

The sensor may generate state data of the vehicle based on a signal generated from the at least one sensor. The vehicle state data may include information generated based on the data sensed by various sensors provided in the vehicle. The sensors may generate vehicle attitude data, vehicle motion data, vehicle yaw data, vehicle roll data, vehicle pitch data, vehicle collision data, vehicle direction data, vehicle angle data, vehicle speed data, vehicle acceleration data, vehicle tilt data, vehicle forward/rearward data, vehicle weight data, battery data, fuel data, tire inflation data, vehicle internal temperature data, humidity data inside a vehicle, steering wheel rotation angle data, vehicle external illuminance data, pressure data applied to an accelerator pedal, pressure data applied to a brake pedal, etc.

The position data generating device may generate position data of the vehicle. The position data generating device may include at least one of a GPS (Global Positioning System) and a DGPS (Differential Global Positioning System). The position data generating device may generate position data of the vehicle based on a signal generated from at least one of the GPS and the DGPS. According to an embodiment, the position data generating device may correct the position data based on at least one of data from the IMU (Inertial Measurement Unit) sensor and the camera of the object detecting device. The device for generating the position data may be referred to as a GNSS (Global Navigation Satellite System).

The shared vehicle 400 may include an internal communication system. A plurality of electronic devices included in the shared vehicle 400 may exchange signals through an internal communication system. The signal may include data. The internal communication system may use at least one communication protocol, for example CAN, LIN, FlexRay, MOST, or Ethernet.

Figure 4:
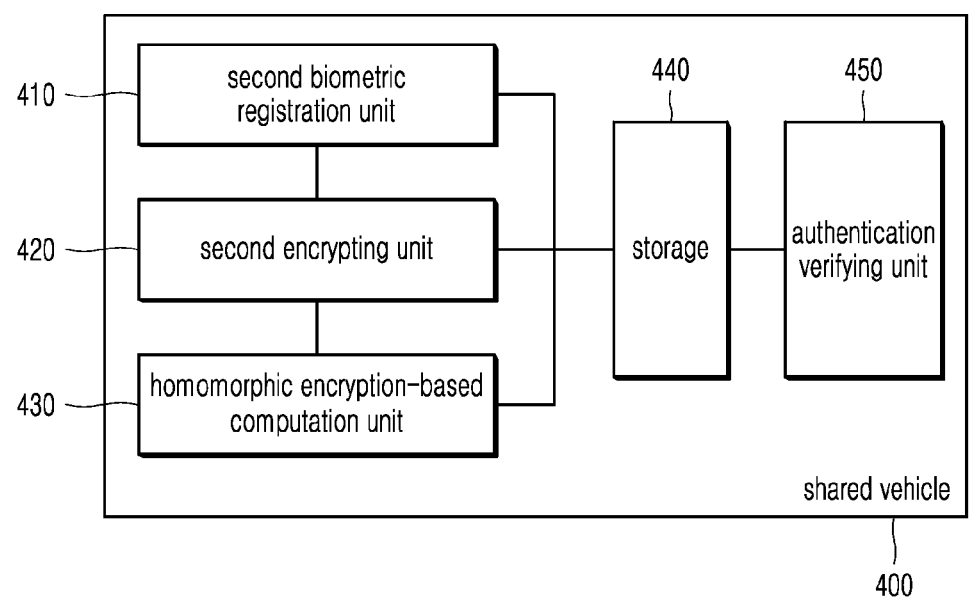
FIG. 4 is a block diagram showing an example configuration of a shared vehicle of FIG. 1 in detail.

FIG. 4 is a block diagram showing an example configuration of the shared vehicle of FIG. 1 in detail.

As shown in FIG. 4, the shared vehicle 400 may include a second biometric registration unit 410 that extracts the user's biometric information to obtain biometric authentication data, a second encrypting unit 420 for encrypting the biometric authentication data acquired from the second biometric registration unit 410 using the public key transmitted from the shared-vehicle server 300, a homomorphic encryption-based computation unit 430 for computing the second biometric information encrypted by the second encrypting unit 420 and the encrypted first biometric information input from the shared-vehicle server 300 using homomorphic encryption (HE), a storage 440 for storing a homomorphic encrypted authentication result, and an authentication verifying unit 450 which authenticates a reserved user by applying the public key transmitted from the shared-vehicle server 300 to a decrypted authentication result corresponding to the homomorphic encrypted authentication result sent to the user device 100. The second biometric registration unit 410 may include a fingerprint authentication sensor that recognizes the user's fingerprint and a camera that recognizes the user's iris. However, the second biometric registration unit 410 is not limited thereto. The second biometric registration unit 410 may include a variety of recognizing units that recognizes at least one of biometric information such as fingerprint, vein, retina, iris, voice, or image.

In this connection, the authentication verifying unit 450 may encrypt the decrypted authentication result input from the user device 100 using the public key sent from the shared-vehicle server 300, and then compare encrypted third biometric information with the encrypted second biometric information transmitted from the shared-vehicle server 300 to authenticate the user.

An operation of the biometric information recognizing system in the shared vehicle according to the present disclosure as configured and described above will be described in detail with reference to the accompanying drawings. The same reference numerals as in FIG. 1 to FIG. 4 refer to the same members performing the same functions in following drawings.

Figure 5:
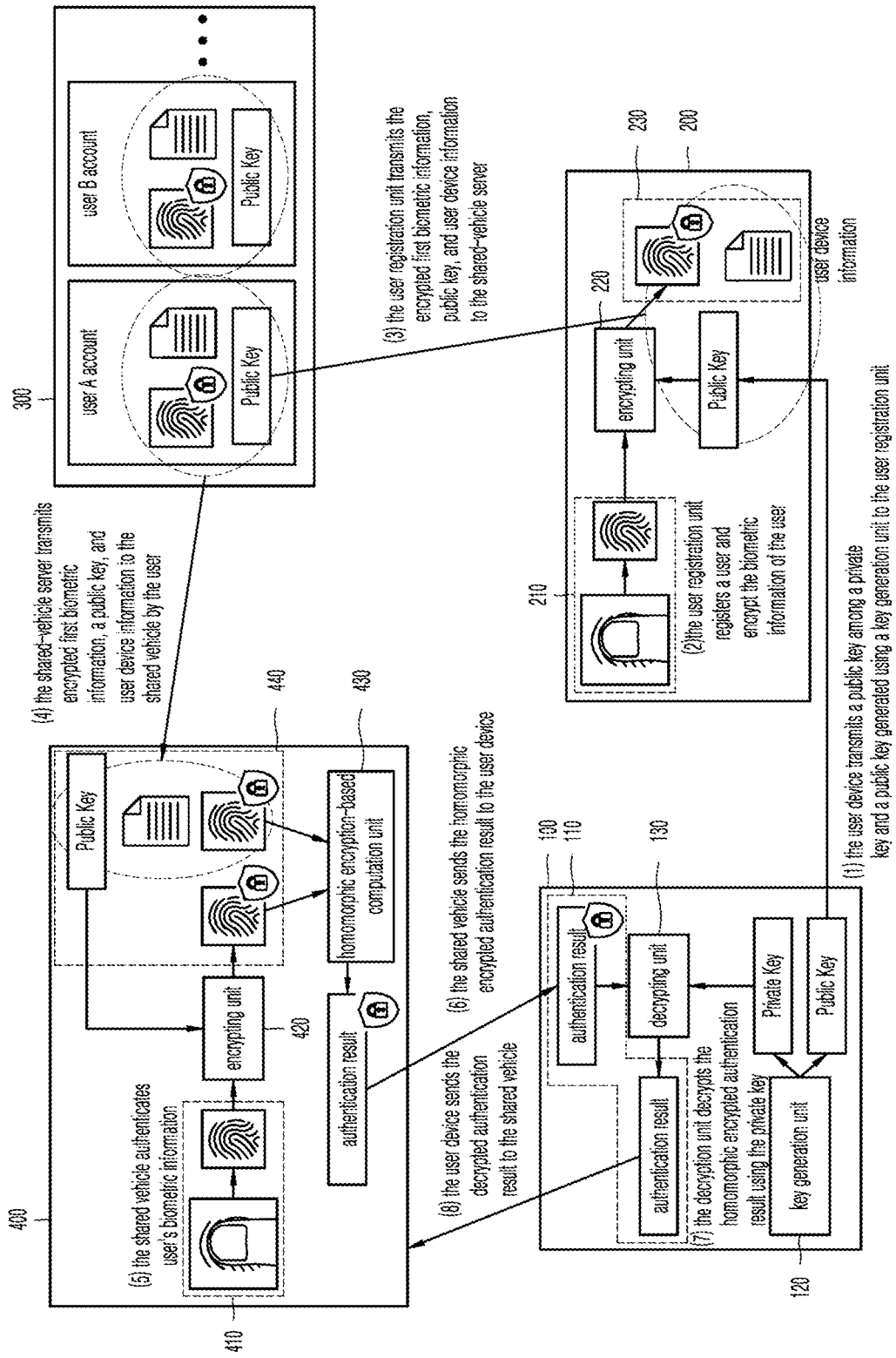
FIG. 5 is a diagram for describing an example operation of a biometric information recognizing system for a shared vehicle.

FIG. 5 is a diagram for describing an example operation of a biometric information recognizing system for a shared vehicle according to the present disclosure embodiment.

Referring to FIG. 5, the user device 100 transmits a public key between a private key and a public key generated using the key generation unit 120 to the user registration unit 200 (1).

The user registration unit 200 stores the public key transmitted from the user device 100 and information about the user device 100 in the storage 230. Then, the first encrypting unit 220 may encrypt the biometric information of the user as extracted from the first biometric registration unit 210 using the public key stored in the storage 230 (2). In this connection, the encrypted biometric information is called first biometric information.

The user registration unit 200 transmits the encrypted first biometric information, public key, and user device information to the shared-vehicle server 300 (3). The shared-vehicle server 300 receives the encrypted first biometric information, public key, and user device information transmitted from the user registration unit 200 and registers each user account for each user and stores each encrypted first biometric information, public key, and user device information for each user.

Subsequently, when a user reservation of the shared vehicle 400 is received from a user registered in the user account, the shared-vehicle server 300 may transmit encrypted first biometric information, a public key, and user device information corresponding to the reserved user account to the shared vehicle 400 reserved by the user (4).

The shared vehicle 400 stores the encrypted first biometric information, the public key, and the user device information input from the shared-vehicle server 300 in the storage 440. Then, the second encrypting unit 420 encrypts the user's biometric information extracted from the second biometric registration unit 410 using the public key stored in the storage 440 (5). In this connection, the encrypted biometric information is called second biometric information.

Subsequently, the homomorphic encryption-based computation unit 430 of the shared vehicle 400 may compute the first biometric information and second biometric information using homomorphic encryption (HE). Then, the shared vehicle 400 sends the homomorphic encrypted authentication result to the user device 100 (6).

In this connection, the HE is a form of encryption that allows computation on ciphertexts, generating an encrypted result which, when decrypted, matches the result of the operations as if they had been performed on the plaintext. HE is a form of encryption with an additional evaluation capability for computing over encrypted data without access to the secret key. The result of such a computation remains encrypted. Homomorphic encryption can be viewed as an extension of either symmetric-key or public-key cryptography. Homomorphic refers to homomorphism in algebra: the encryption and decryption functions can be thought as homomorphisms between plaintext and ciphertext spaces.

Homomorphic encryption includes multiple types of encryption schemes that can perform different classes of computations over encrypted data. Some common types of homomorphic encryption are partially homomorphic, somewhat homomorphic, leveled fully homomorphic, and fully homomorphic encryption. The computations are represented as either Boolean or arithmetic circuits. Partially homomorphic encryption encompasses schemes that support the evaluation of circuits consisting of only one type of gate, e.g., addition or multiplication. Somewhat homomorphic encryption schemes can evaluate two types of gates, but only for a subset of circuits. Leveled fully homomorphic encryption supports the evaluation of arbitrary circuits of bounded (pre-determined) depth. Fully homomorphic encryption (FHE) allows the evaluation of arbitrary circuits of unbounded depth, and is the strongest notion of homomorphic encryption. For the majority of homomorphic encryption schemes, the multiplicative depth of circuits is the main practical limitation in performing computations over encrypted data.

Homomorphic encryption schemes are inherently malleable. In terms of malleability, homomorphic encryption schemes have weaker security properties than non-homomorphic schemes.

Homomorphic encryption can be used for privacy-preserving outsourced storage and computation. This allows data to be encrypted and out-sourced to commercial cloud environments for processing, all while encrypted. In highly regulated industries, such as health care, homomorphic encryption can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished.

Thus, in accordance with the present disclosure, the homomorphic encryption techniques may prevent leakage and tampering of personal biometric information.

The decryption unit 130 of the user device 100 decrypts the homomorphic encrypted authentication result input from the shared vehicle 400 using the private key (7). In this connection, the private key used for the decryption refers to the private key generated together with the public key from the key generation unit 120.

Then, the user device 100 sends the decrypted authentication result to the shared vehicle 400 (8).

The authentication verifying unit 450 of the shared vehicle 400 authenticates the reserved user based on the decrypted authentication result.

A method of authenticating the reserved user may involve using the authentication verifying unit 450 to encrypt the decrypted authentication result input from the user device 100 using the public key transmitted from the shared-vehicle server 300. In this connection, the encrypted biometric information is referred to as third biometric information. Then, the authentication verifying unit 450 may compare the third biometric information with the second biometric information transmitted from the shared-vehicle server 300 to authenticate the user. That is, if the third biometric information and the second biometric information are the same, the user is determined as a true reserved user. If they are not identical with each other, it is determined that the user is not the true reserved user.

As such, the encrypted authentication result is decrypted by the user device 100. Therefore, even when the encrypted biometric information has been leaked from the shared-vehicle server 300 and the shared vehicle 400, only a true user may decrypt the encrypted biometric information into original data thereof.

Figure 6:
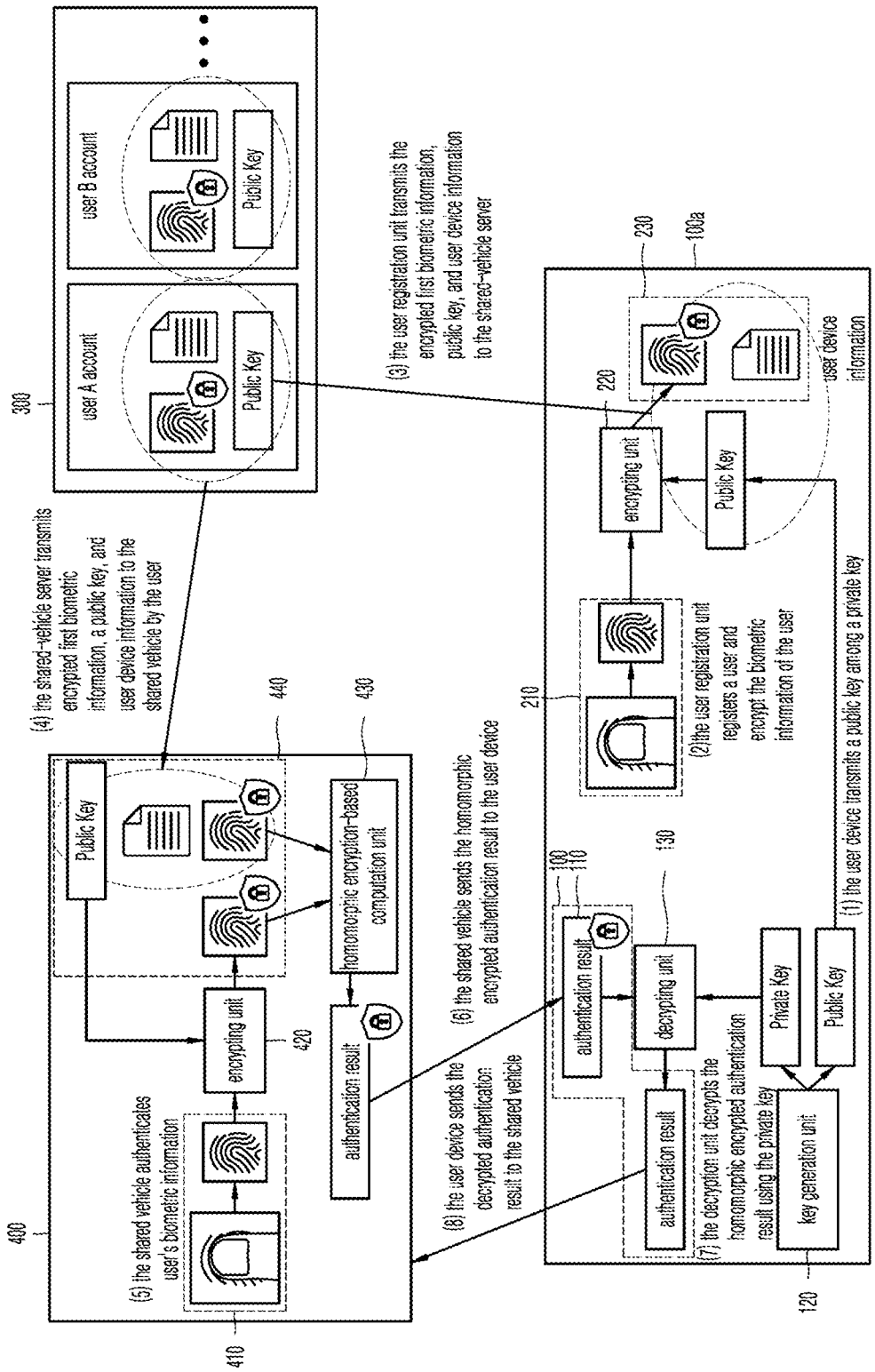
FIG. 6 is a diagram for describing an example operation of a biometric information recognizing system for a shared vehicle.

FIG. 6 is a diagram for describing an example operation of a biometric information recognizing system for a shared vehicle according to another embodiment of the present disclosure.

As illustrated in FIG. 6, the user registration unit 200 may be included in the user device 100 and may be integrated with the user device 100 to define the integrated device 100*a* together.

However, the present disclosure is not limited thereto. In another example, the user registration unit 200 may be included in the shared-vehicle server 300 and may be integrated with the shared-vehicle server 300.

Then, the operation of the biometric information recognizing system in the shared vehicle shown in FIG. 6 is identical to the operation of the biometric information recognizing system in the shared vehicle of FIG. 5 as described above except that the user registration unit 200 and the user device 100 are integrated with each other in FIG. 6. Accordingly, detailed descriptions of the biometric information recognizing system in the shared vehicle shown in FIG. 6 will be omitted.

Figure 7:
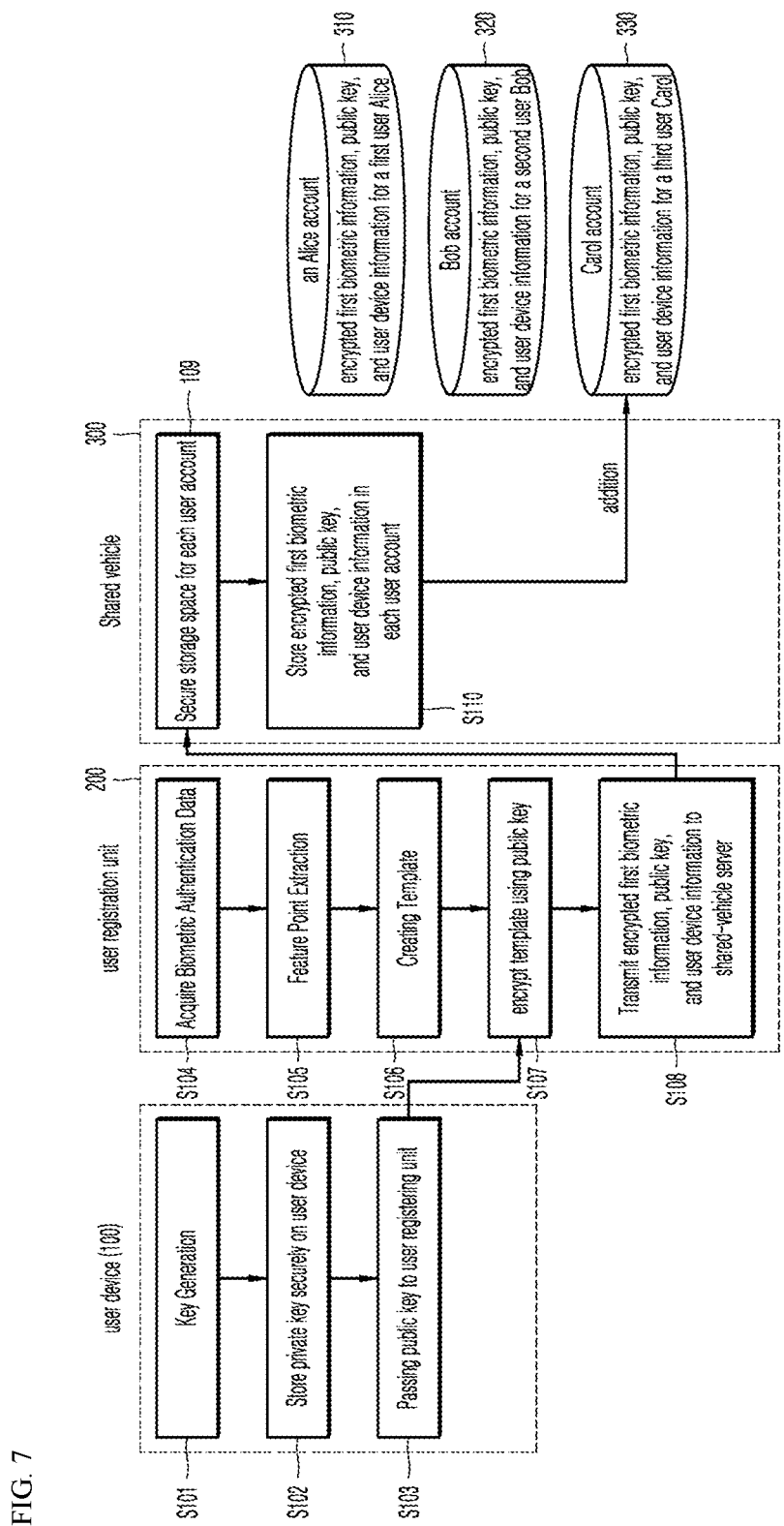
FIG. 7 is a diagram to describe in detail an example user registration process of FIG. 5.

FIG. 7 is a diagram to describe in detail an example user registration process of FIG. 5.

Referring to FIG. 7, the key generation unit 120 of the user device 100 generates a private key and a public key (S101).

Then, the generated private key is stored in the user device 100 (S102). In this connection, the private key stored in the user device 100 may be stored securely by compressing the key, or encrypting the key, or password allocation thereto. Further, the generated public key is sent to the user registration unit 200 (S103).

Then, the first biometric registration unit 210 of the user registration unit 200 extracts the biometric information of the user to obtain biometric authentication data (S104). The first biometric registration unit 210 extracts a feature point from the obtained biometric authentication data (S105), and generates a template (S106).

Subsequently, the user registration unit 200 encrypts the biometric information generated into the template using the public key delivered from the user device 100 (S107). In this connection, the encrypted biometric information is called first biometric information.

Then, the user registration unit 200 transmits the encrypted first biometric information, public key, and user device information to the shared-vehicle server 300 (S108).

The shared-vehicle server 300 secures a storage space for each user account (S109) and stores the encrypted first biometric information, public key, and user device information inputted from the user registration unit 200 in each user account (S110). Accordingly, the shared-vehicle server 300 stores the encrypted first biometric information, the public key, and the user device information for each user.

In one example, the shared-vehicle server 300 may include an Alice account DB 310 that stores encrypted first biometric information, public key, and user device information for a first user Alice, and a Bob account DB 320 that stores encrypted first biometric information, public key, and user device information for a second user Bob, and a Carol account DB 330 that stores encrypted first biometric information, public key, and user device information for a third user Carol.

Figure 8:
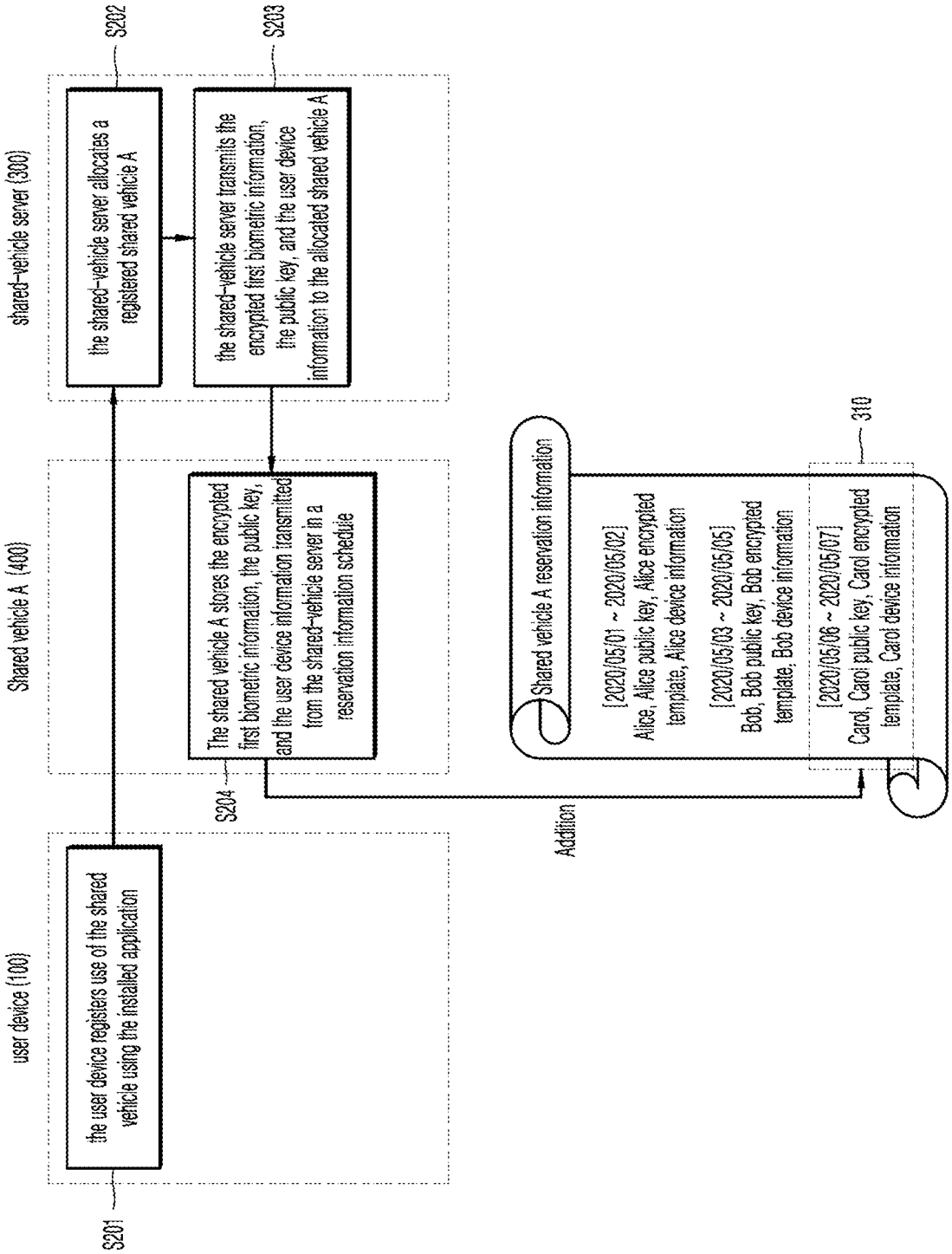
FIG. 8 is a diagram to describe an example shared vehicle reservation process of FIG. 5 in detail.

FIG. 8 is a diagram to describe an example shared vehicle reservation process of FIG. 5 in detail.

Referring to FIG. 8, the user device 100 registers use of the shared vehicle using the installed application or the like (S201). In this connection, the shared vehicle use registration may be performed by searching for and selecting information about the shared vehicle 400 provided by the shared-vehicle server 300. A method for the user to search for and select the shared vehicle 400 may be embodied in various embodiments which are already known. Thus, detailed descriptions thereof are omitted.

When the registration for use of the shared vehicle is completed in the user device 100, the shared-vehicle server 300 allocates a registered shared vehicle A (S202). In this connection, the shared-vehicle server 300 may allocate the shared vehicle based on a type, position, and shareability of the shared vehicle registered from the user.

Subsequently, the shared-vehicle server 300 transmits the encrypted first biometric information, the public key, and the user device information stored in a user account registering the use of the shared vehicle among user accounts registered in a user-specific manner to the allocated shared vehicle A 400 (S203). In this connection, the shared-vehicle server 300 may transmit a shared vehicle reservation time registered by the user to the shared vehicle A 400. The shared-vehicle server 300 may store therein information about the allocated shared vehicle A, user account information, and reservation time information.

The shared vehicle A 400 stores the encrypted first biometric information, the public key, and the user device information transmitted from the shared-vehicle server 300 in a reservation information schedule (S204). In this connection, the shared vehicle A 400 stores newly-input reservation information into a reservation information schedule previously stored therein for each reserved time using reservation time information transmitted from the shared-vehicle server 300.

Figure 9:
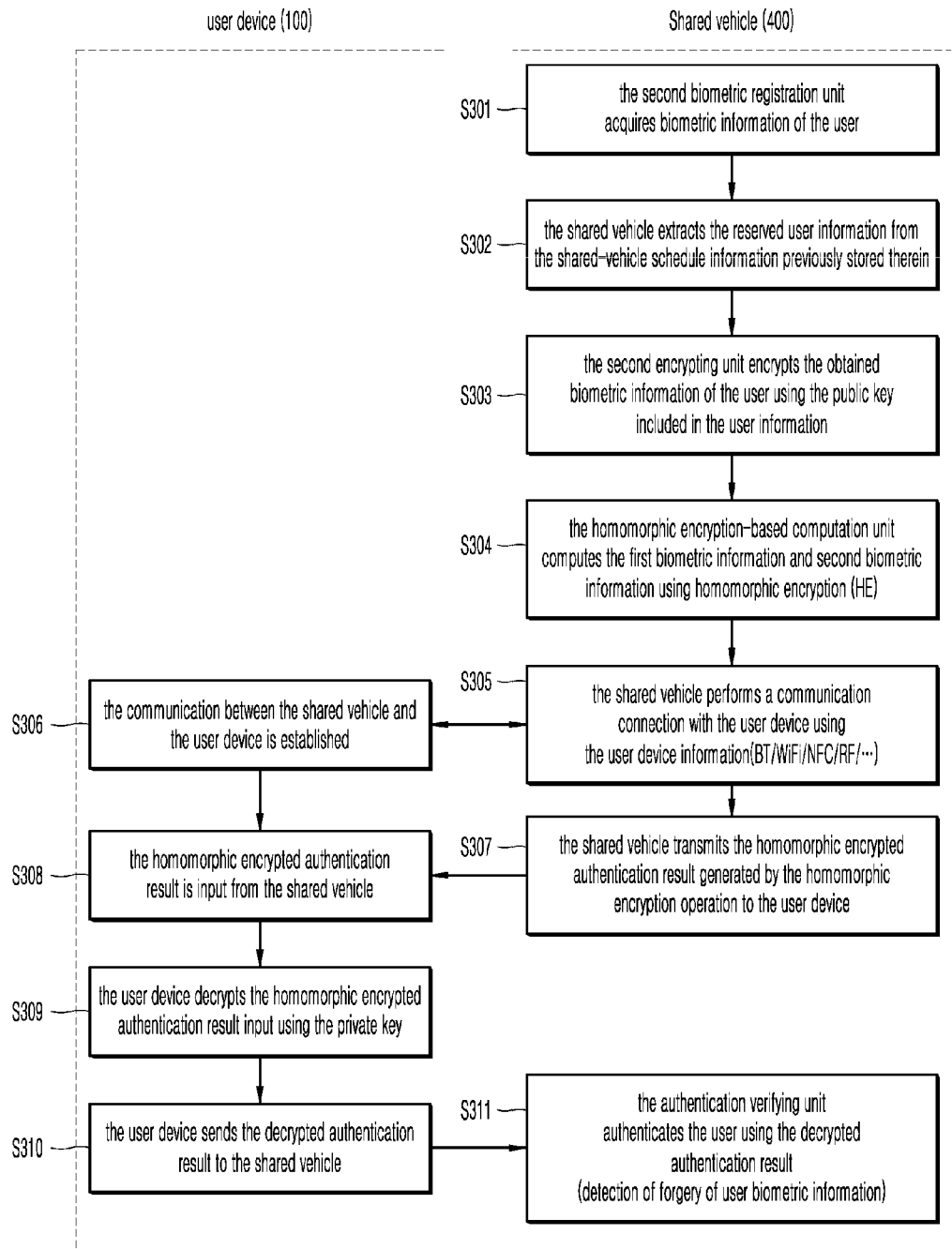
FIG. 9 shows details of an example user authentication process of FIG. 5.

FIG. 9 shows details of an example user authentication process of FIG. 5.

Referring to FIG. 9, the second biometric registration unit 410 of the shared vehicle 400 acquires biometric information of the user (S301). In more detail, the second biometric registration unit 410 of the shared vehicle 400 obtains biometric authentication data by extracting the user's biometric information. Then, the second biometric registration unit 410 of the shared vehicle 400 may generate a template by extracting a feature point from the obtained biometric authentication data.

Subsequently, the shared vehicle 400 extracts the reserved user information from the shared-vehicle schedule information previously stored therein (S302). In this connection, the extracted user information may include encrypted first biometric information, public key, and user device information.

The second encrypting unit 420 of the shared vehicle 400 encrypts the obtained biometric information of the user using the public key included in the user information (S303). In this connection, the encrypted biometric information is called second biometric information.

Then, the homomorphic encryption-based computation unit 430 of the shared vehicle 400 computes the first biometric information and second biometric information using homomorphic encryption (HE). The HE was described as above. The homomorphic encryption-based computation unit 430 may generate a homomorphic encrypted authentication result (S304).

Subsequently, the shared vehicle 400 performs a communication connection with the user device using the user device information included in the user information (S305). In this connection, the communication may be performed using a communication based on Bluetooth, WiFi, NFC (Near Field Communication), or RF (Radio Frequency).

Accordingly, when the communication between the shared vehicle 400 and the user device 100 is established (S306), the shared vehicle 400 transmits the homomorphic encrypted authentication result generated by the homomorphic encryption operation to the user device 100 (S307).

When the homomorphic encrypted authentication result is input from the shared vehicle 400 to the user device 100 (S308), the user device 100 decrypts the homomorphic encrypted authentication result input using the private key (S309). In this connection, the private key used for the decryption refers to the private key is generated together with the public key from the key generation unit 120.

Then, the user device 100 sends the decrypted authentication result to the shared vehicle 400 (S310).

When the shared vehicle 400 receives the decrypted authentication result from the user device 100, the authentication verifying unit 450 of the shared vehicle 400 may authenticate the user based on the decrypted authentication result (S311).

Figure 10:
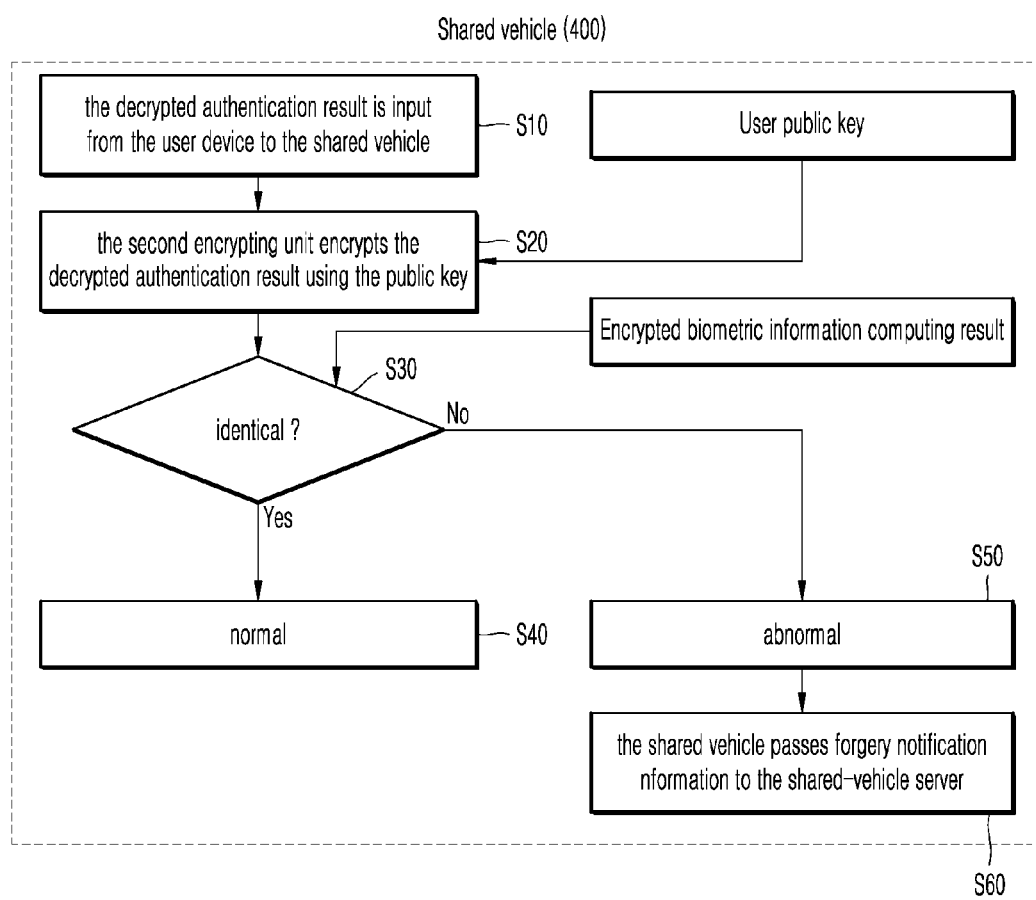
FIG. 10 is a diagram to describe in detail an example process for authenticating a reserved user of FIG. 9.

FIG. 10 is a diagram to describe in detail an example process for authenticating a reserved user of FIG. 9.

Referring to FIG. 10, when the decrypted authentication result is input from the user device 100 to the shared vehicle 400 (S10), the second encrypting unit 420 of the shared vehicle 400 encrypts the decrypted authentication result using the public key (S20). In this connection, the public key refers to the public key included in the user information input from the shared-vehicle server 300. Further, in this connection, the encrypted biometric information is referred to a third biometric information.

Subsequently, the authentication verifying unit 450 of the shared vehicle 400 compares the third biometric information with the second biometric information input from the shared-vehicle server 300 (S30).

Based on the comparison result (S30), if the third biometric information and the second biometric information are same, the shared vehicle 400 determines that the user is a true reserved user (S40).

Based on the comparison result (S30), if the third biometric information and the second biometric information are not same, the shared vehicle 400 determines that the user is not a true reserved user (S50). Then, the shared vehicle 400 passes forgery notification information that the user is not the true reserved user to the shared-vehicle server 300 (S60).

Figure 11:
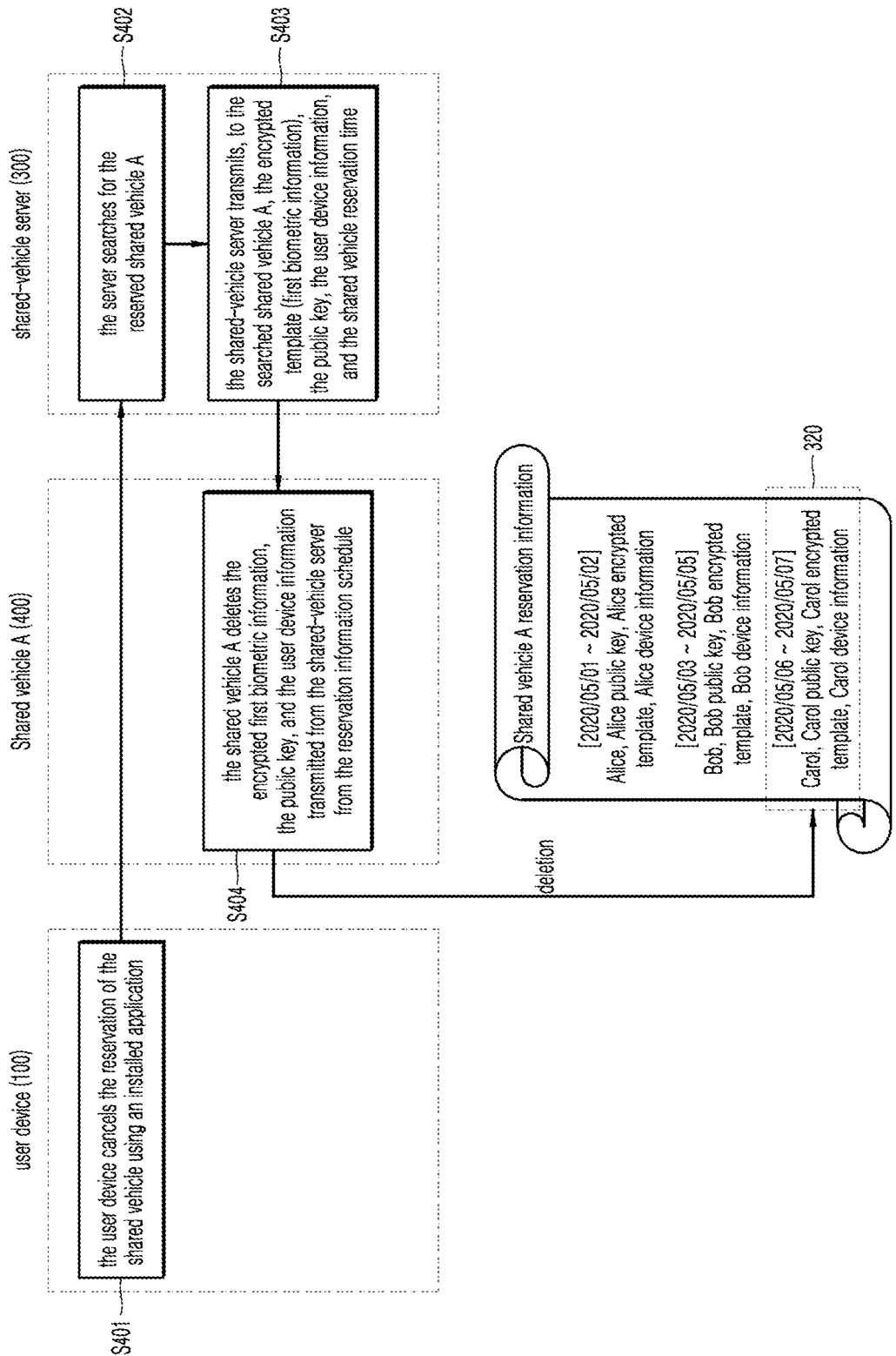
FIG. 11 is a diagram to describe in detail an example shared vehicle reservation cancellation process of FIG. 5.

FIG. 11 is a diagram to describe in detail an example shared vehicle reservation cancellation process of FIG. 5.

Referring to FIG. 11, the user device 100 cancels the reservation of the shared vehicle using an installed application or the like. (S401). In this connection, the shared vehicle reservation cancellation may be performed by searching for and selecting reservation information provided by the shared-vehicle server 300. Various methods for a user to search for and select the reservation information may be provided and may be already known. Thus, the detailed description thereof is omitted.

When the shared-vehicle server 300 receives the cancellation of the reservation of the shared vehicle from the user device 100, the shared-vehicle server 300 may search for the reserved shared vehicle A (S402).

Subsequently, the shared-vehicle server 300 transmits, to the searched shared vehicle A 400, the encrypted first biometric information, the public key, and the user device information stored in a user account corresponding to the reservation cancellation of the shared vehicle (S403). In this connection, the shared-vehicle server 300 may further transmit the shared vehicle reservation time that the user has registered to the shared vehicle A 400. The shared-vehicle server 300 may store the information about the reservation-cancelled shared vehicle A, user account information, reservation time information, and the like.

Subsequently, the shared vehicle A 400 deletes the encrypted first biometric information, the public key, and the user device information transmitted from the shared-vehicle server 300 from the reservation information schedule. In this connection, the shared vehicle A 400 deletes the reservation information 320 as canceled from the reservation information schedule previously stored therein for each reserved time using the reservation time information transmitted from the shared-vehicle server 300.

Figure 12:
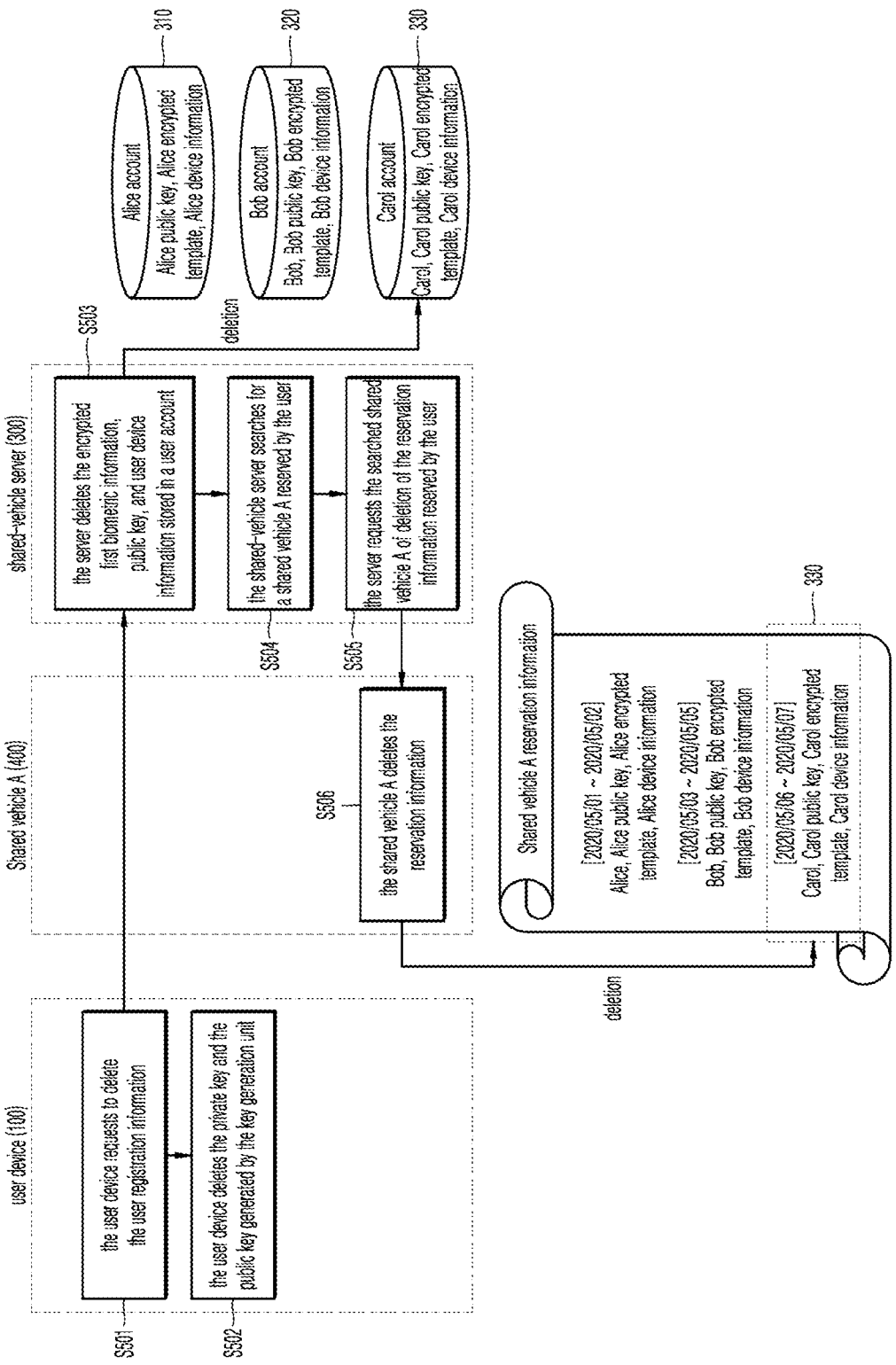
FIG. 12 is a diagram to describe in detail an example user deregistration process of FIG. 5.

FIG. 12 is a diagram to describe in detail an example user deregistration process of FIG. 5.

Referring to FIG. 12, the user device 100 requests to delete the user registration information using an installed application or the like (S501). In this connection, the user registration information deletion may be performed by selecting a user registration information deletion icon provided by the shared-vehicle server 300. Various methods for the user to select the deletion of the user registration information may be already known. Thus, the detailed description thereof is omitted.

Then, the user device 100 deletes the private key and the public key generated by the key generation unit 120 (S502). In this connection, as long as the private key is deleted, the first and second biometric information stored in the user registration unit 200, the shared-vehicle server 300, and the shared vehicle 400 in an encrypted manner may no longer be available for decryption.

Then, when the shared-vehicle server 300 receives a request to delete a user registration from the user device 100, the shared-vehicle server 300 may delete the encrypted first biometric information, public key, and user device information stored in a user account corresponding to the request among the registered user accounts 310, 320 and 330 (S503).

Then, the shared-vehicle server 300 searches for a shared vehicle A 400 reserved by the user (S504). The shared-vehicle server 300 requests the searched shared vehicle A to delete the reservation information reserved by the user (S505). In this connection, the deletion request of the reservation information may include a request to delete all reservation information previously provided by the user with respect to the shared vehicle 400.

The shared vehicle A 400 deletes the reservation information of the user transmitted from the shared-vehicle server 300 from the reservation information schedule (S506). In this connection, the reservation information as deleted may include the encrypted first biometric information, public key, and user device information.

Figure 13:
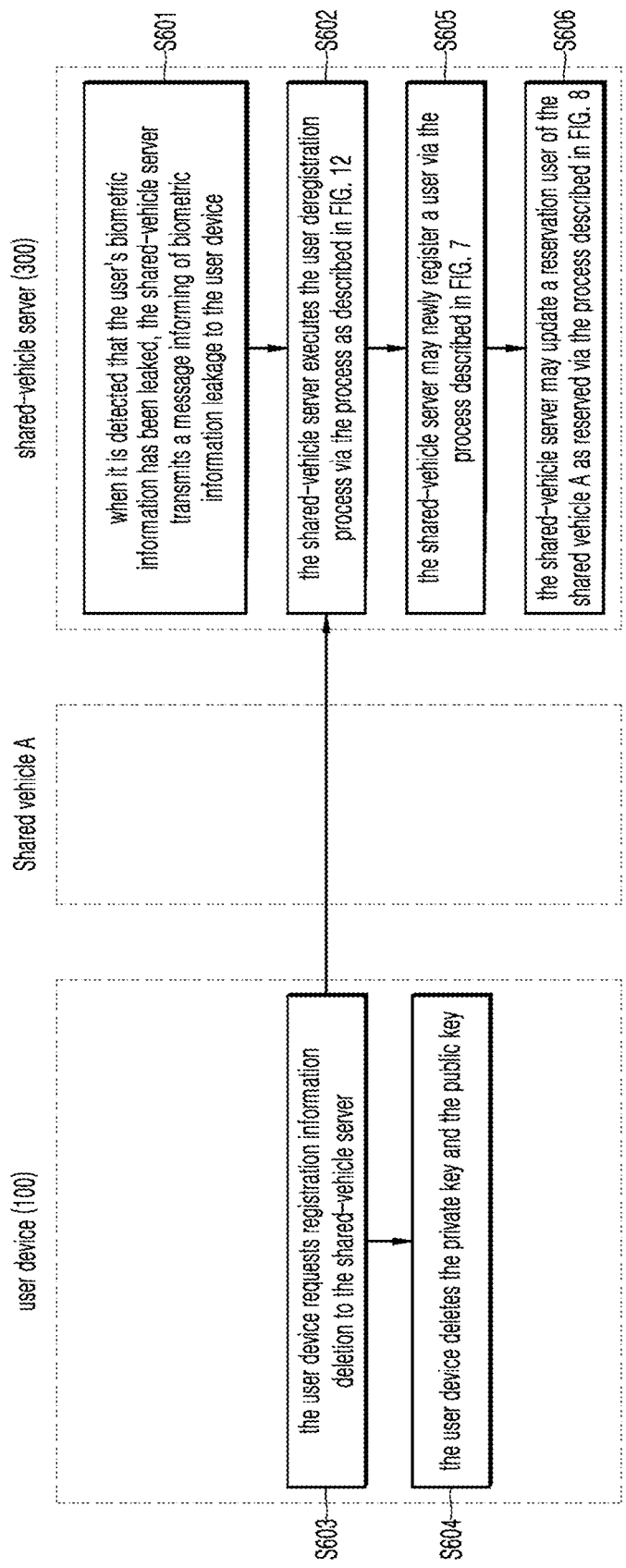
FIG. 13 is a diagram to describe an example process occurring in response to an event of a personal information leakage accident in a shared-vehicle server in FIG. 5.

FIG. 13 is a diagram to describe an example process occurring in response to an event of a personal information leakage accident in a shared-vehicle server of FIG. 5.

Referring to FIG. 13, if it is detected that the user's biometric information has been leaked from the user account, the shared-vehicle server 300 transmits a message informing of biometric information leakage to the user device 100 of the user corresponding to the leakage (S601).

When the user device 100 receives the biometric information leak notification message from the shared-vehicle server 300, the user device 100 requests registration information deletion to the shared-vehicle server 300 (S603) and then deletes the private key and the public key generated from the user device 100 (S604).

Then, the shared-vehicle server 300 executes the user deregistration process via the process as described in FIG. 12 (S602).

Then, the shared-vehicle server 300 may newly register a user via the process described in FIG. 7 (S605). Then, when the new user registration is completed, the shared-vehicle server 300 may update a reservation user of the shared vehicle A 400 as reserved via the process described in FIG. 8 (S606).

Figure 14:
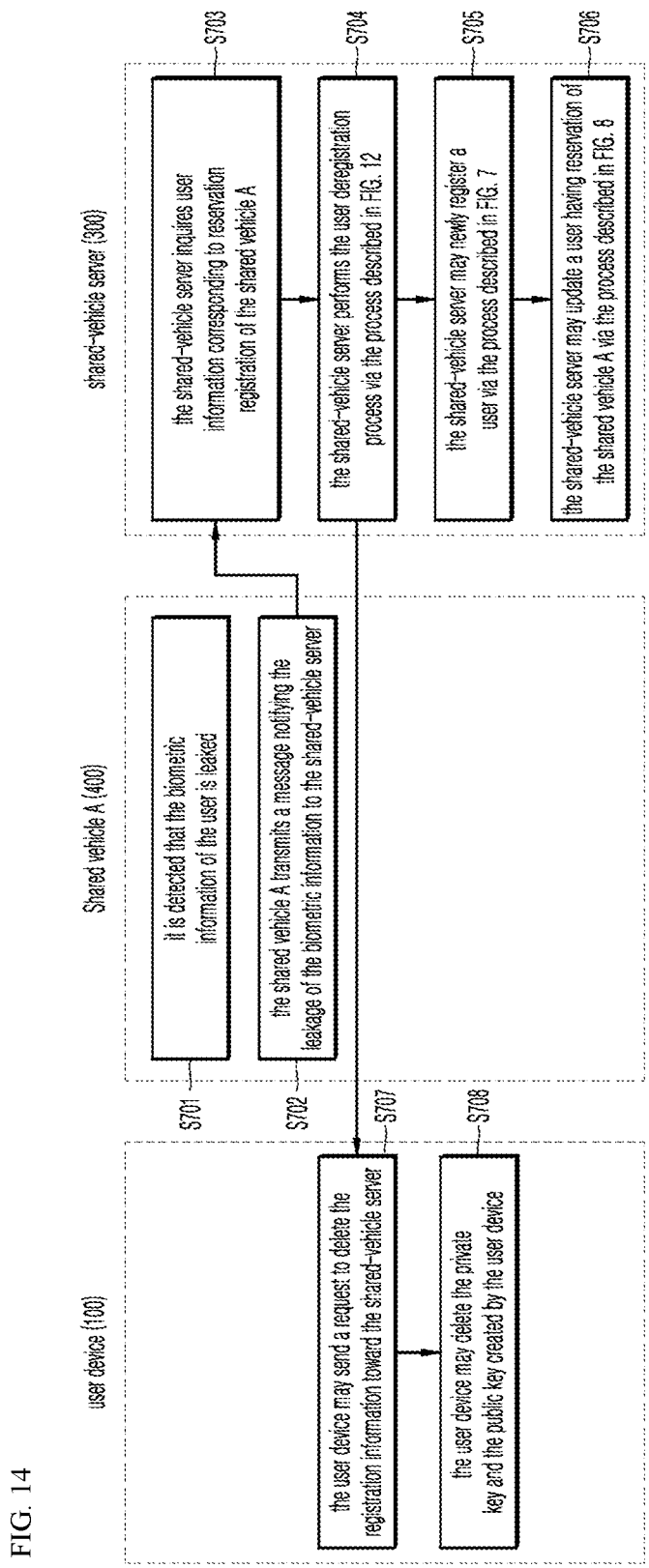
FIG. 14 is a diagram to describe an example process occurring in response to an event of a personal information leakage accident in a shared vehicle of FIG. 5.

FIG. 14 is a diagram to describe an example process occurring in response to an event of a personal information leakage accident in a shared vehicle of FIG. 5.

Referring to FIG. 14, if it is detected that the biometric information of the user stored in the storage 440 is leaked (S701), the shared vehicle A 400 transmits a message notifying the leakage of the biometric information to the shared-vehicle server 300 (S702). In this connection, the delivered message may include user device information.

When the shared-vehicle server 300 receives the biometric information leakage message from the shared vehicle A 400, the shared-vehicle server 300 inquires user information corresponding to reservation registration of the shared vehicle A 400 (S703). In this connection, when the user device information is included in the message from the shared vehicle A 400, the shared-vehicle server 300 may further increase inquiry answer accuracy by comparing the inquired user information and the delivered user device information with each other.

Subsequently, the shared-vehicle server 300 forwards a message notifying the leakage of the biometric information to the user device 100 of the user subject to the leakage via the process described in FIG. 13.

Then, when the user device 100 receives the biometric information leakage notification message from the shared-vehicle server 300, the user device 100 may send a request to delete the registration information toward the shared-vehicle server 300 (S707) and may delete the private key and the public key created by the user device 100 (S708).

In addition, the shared-vehicle server 300 performs the user deregistration process via the process described in FIG. 12 (S704).

Then, the shared-vehicle server 300 may again register a new user via the process described in FIG. 7 (S705). Then, when the new user has been registered, the shared-vehicle server 300 may update a user having reservation of the shared vehicle A 400 via the process described in FIG. 8 (S706).

Figure 15:
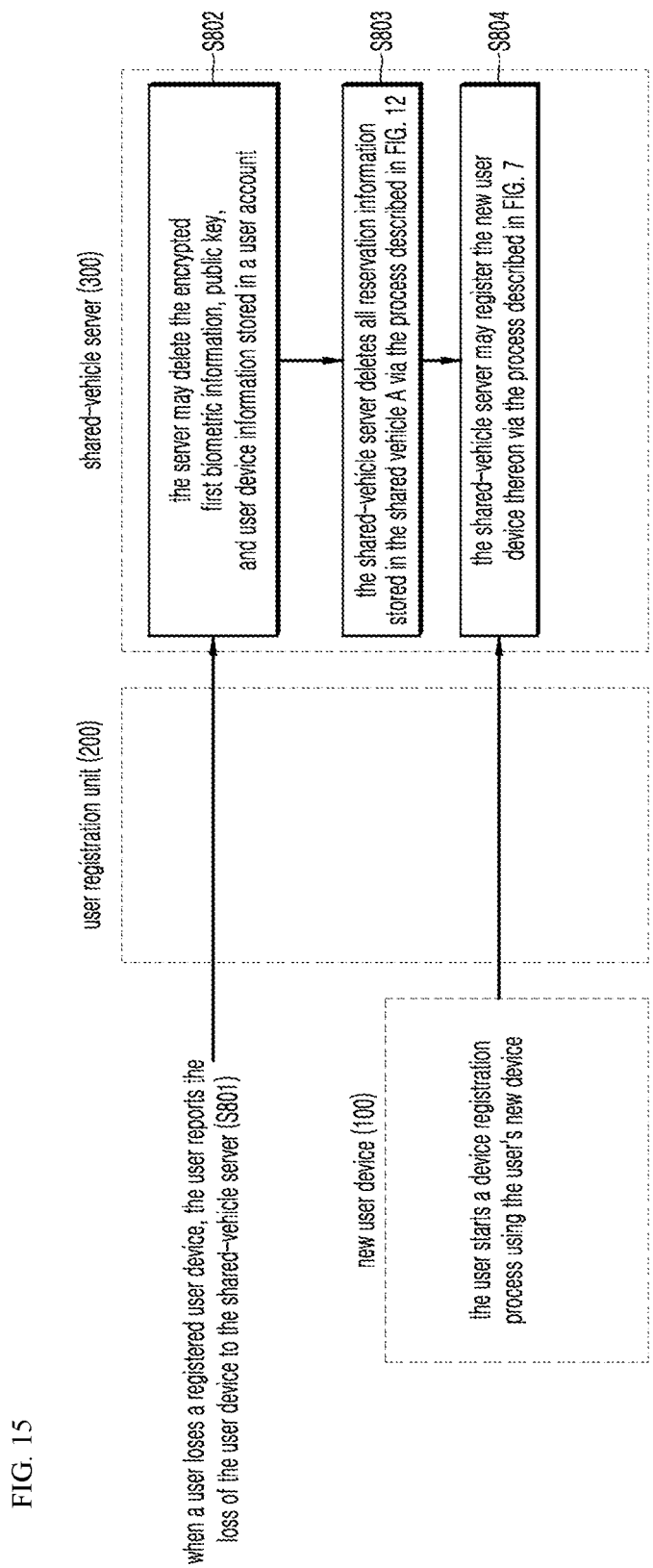
FIG. 15 is a diagram to describe an example process occurring in response to an event of a user device loss process of FIG. 5.

FIG. 15 is a diagram to describe an example process occurring in response to an event of a user device loss process in FIG. 5.

Referring to FIG. 15, when a user loses a registered user device 100, the user reports the loss of the user device 100 as registered to the shared-vehicle server 300 (S801). In this connection, the loss notification of the user device 100 may be made via phone, ARS, an application installed on an unregistered user device, or via accessing a site on the shared-vehicle server 300.

When the shared-vehicle server 300 receives the loss report of the user device 100 from the user, the shared-vehicle server 300 may delete the encrypted first biometric information, public key, and user device information stored in a user account 330 of the requesting user among the registered user accounts 310, 320 and 330 (S802).

Then, the shared-vehicle server 300 deletes all reservation information stored in the shared vehicle A 400 via the process described in FIG. 12 (S803).

Then, when the user starts a device registration process using a new user device 100, the shared-vehicle server 300 may register the new user device 100 thereon via the process described in FIG. 7 (S804).

Although the present disclosure has been described with reference to the drawings and embodiments as exemplified above, the present disclosure is not limited to the embodiments and the drawings disclosed herein. It is obvious that various modifications may be made thereto by a person skilled in the art within the scope of the present disclosure. In addition, it should be appreciated that effects to be achieved from configurations of the present disclosure as not expressly mentioned may be acknowledged.

What is claimed is:

1. A system for recognizing user biometric information, comprising:
    a key generation unit configured to generate a private key and a public key;
    a decrypting unit configured to:
        receive an authentication result from a vehicle, wherein the authentication result is generated based on user biometric information and the public key; and
        decrypt the authentication result using the private key; and
    an authentication result processing unit configured to:
        transmit the decrypted authentication result to the vehicle; and
        verify identity authentication received from the vehicle, wherein the identity authentication is performed by the vehicle based on the decrypted authentication result.

2. The system of claim 1, further comprising a user registration unit configured to:
    receive the user biometric information; and
    generate first biometric information by encrypting the user biometric information using the public key.

3. The system of claim 2, wherein the user registration unit comprises:
    a first biometric registration unit configured to extract biometric information of a user to obtain biometric authentication data;
    a first encrypting unit configured to generate the first biometric information by encrypting the obtained biometric authentication data using the public key; and
    a storage configured to store the public key, user device information, and the first biometric information.

4. The system of claim 1, further comprising a shared-vehicle server configured to:
    allocate the vehicle to a user device; and
    transmit encrypted first biometric information, the public key, and user device information stored in a user account to the allocated vehicle.

5. The system of claim 4, wherein the shared-vehicle server is further configured to:
    detect that user biometric information stored in a specific user account has been leaked from the shared-vehicle server;
    transmit a message to a user device corresponding to the user account to notify a user of the leakage of the user biometric information;
    receive a request for user deregistration to the shared-vehicle server; and
    in response to reception of the request, deregister a user corresponding to the user device via a user deregistration operation.

6. The system of claim 4, wherein the shared-vehicle server is further configured to:
    receive a first message to notify the shared-vehicle server of the leakage of the user biometric information;
    in response to reception of the first message, search user information corresponding to the shared vehicle; and
    deliver a second message informing a user of the leakage of user information to a user device corresponding to the leaked user information.

7. A method for recognizing user biometric information, comprising:
    generating, by a key generation unit, a private key and a public key;
    generating, by a first encrypting unit, first biometric information by encrypting biometric authentication data using the public key;
    receiving, by a decrypting unit, second biometric information from a vehicle, wherein the second biometric information is generated based on user biometric information and the public key;
    decrypting, by the decrypting unit, the second biometric information using the private key;
    transmitting a decrypted authentication result to the vehicle;
    comparing, by an authentication verifying unit, the second biometric information and third biometric information, wherein the third biometric information is generated by encrypting the decrypted authentication result using the public key; and
    authenticating, by the authentication verifying unit, a user based on the comparison result.

8. The method of claim 7, further comprising:
    receiving, by a user registration unit, user biometric information; and
    generating, by the user registration unit, the first biometric information by encrypting the user biometric information using the public key.

9. The method of claim 8, wherein generating the first biometric information comprises:

extracting, by a first biometric registration unit, biometric information of a user to acquire biometric authentication data;
generating, by a first encrypting unit, the first biometric information, wherein the first biometric information is generated by encrypting the acquired biometric authentication data using the public key; and
storing the public key, user device information, and the third biometric information.

10. The method of claim 7, wherein authenticating the user comprises:
extracting user biometric information by a second biometric registration unit to obtain biometric authentication data;
generating, by a second encrypting unit, the second biometric information, wherein the second biometric information is generated by encrypting the obtained biometric authentication data using the public key; and
computing, by a homomorphic encryption-based computation unit, the first biometric information and the second biometric information using homomorphic encryption (HE).

11. The method of claim 7, wherein authenticating the user further comprises:
receiving, by a second encrypting unit, the decrypted authentication result from a user device;
generating, by the second encrypting unit, the third biometric information by encrypting the decrypted authentication result using the public key;
comparing, by the authentication verifying unit, the second biometric information and the third biometric information with each other;
determining, based on the comparison result revealing that the first biometric information and the second biometric information match, by the authentication verifying unit, that the user is a reserved user; and
determining, based on the comparison result revealing that the first biometric information and the second biometric information do not match, by the authentication verifying unit, that the user is not a reserved user.

12. The method of claim 7, further comprising user device registration operations, wherein the user device registration operations comprise:
generating a private key and a public key by the key generation unit;
storing the private key in the user device and transmitting the public key to a user registration unit;
extracting user biometric information by a first biometric information registration unit to obtain biometric authentication data;
extracting, by the first biometric information registration unit, feature points from the obtained biometric authentication data to generate a template;
generating first biometric information by encrypting the template corresponding to the biometric information using the public key;
transmitting the first biometric information, the public key, and information about the user device to a shared-vehicle server; and
storing, by the shared-vehicle server, the first biometric information, the public key, and information about the user device in a user account.

13. The method of claim 7, further comprising shared vehicle reservation operations, wherein the shared vehicle reservation operations comprise:
registering, by a user device, a shared vehicle on a shared-vehicle server;
allocating, by the shared-vehicle server, the registered shared vehicle to the user device;
transmitting, from the shared-vehicle server to the allocated shared vehicle, encrypted first biometric information, the public key, and user device information stored in a user account; and
receiving and storing, by the allocated shared vehicle, the encrypted first biometric information, the public key, and the user device information.

14. The method of claim 7, further comprising shared vehicle reservation cancellation operations, wherein the shared vehicle reservation cancellation operations comprise:
transmitting, by a user device, a shared vehicle reservation cancellation to a shared-vehicle server;
searching, by the shared-vehicle server, a reserved shared vehicle corresponding to the user device;
transmitting, from the shared-vehicle server to the shared vehicle, encrypted first biometric information, the public key, and user device information stored in a user account; and
deleting, by the shared vehicle, the first biometric information, the public key, and user device information from reservation information of the shared vehicle.

15. The method of claim 7, further comprising user deregistration operations, wherein the user deregistration operations comprise:
activating a user deregistration application installed on a user device to transmit a user deregistration request to a shared-vehicle server;
deleting, by the user device, the private key and the public key stored in the user device;
in response to reception of the user deregistration request, deleting, by the shared-vehicle server, encrypted third biometric information, the public key, and user device information stored in a user account;
searching, by the shared-vehicle server, a reserved shared vehicle corresponding to the user device;
transmitting, from the shared-vehicle server to the searched shared vehicle, a request for deletion of reservation information corresponding to the user device; and
in response to reception of the deletion request, deleting, by the shared vehicle, the reservation information corresponding to the user device from a reservation information of the shared vehicle.

16. The method of claim 7, further comprising:
detecting, by a shared-vehicle server, that user biometric information stored in a specific user account has been leaked from the shared-vehicle server;
transmitting, by the shared-vehicle server, a message to a user device corresponding to the user account to notify a user of the leakage of the user biometric information;
in response to reception of the message, transmitting, by the user device, a request for user deregistration to the shared-vehicle server;
deleting, by the user device, the private key and the public key stored in the user device; and
in response to reception of the request, deregistering, by the shared-vehicle server, a user corresponding to the user device via a user deregistration operation.

17. The method of claim 7, further comprising:
detecting, by a shared vehicle, that user biometric information stored therein has been leaked from the shared vehicle;
transmitting, by the shared vehicle, a first message to a shared-vehicle server to notify the shared-vehicle server of the leakage of the user biometric information;

in response to reception of the first message, searching, by the shared-vehicle server, user information corresponding to the shared vehicle;

delivering, by the shared-vehicle server and to a user device corresponding to the leaked user information, a second message informing a user of the leakage of user information; and in response to reception of the second message, deregistering, by the user device, a user corresponding to the user device.

18. The method of claim 7, further comprising:

receiving, by a shared-vehicle server, a loss report of a user device;

in response to reception of the loss report, deleting, by the shared-vehicle server, the first biometric information, the public key, and user device information stored in a user account corresponding to the user device;

canceling, by the shared-vehicle server, a shared vehicle reservation; and registering, by the shared-vehicle server, a new user device.

\* \* \* \* \*